(12) United States Patent
Lonkar et al.

(10) Patent No.: US 8,799,425 B2
(45) Date of Patent: Aug. 5, 2014

(54) CONFIGURING DISPLAY PROPERTIES OF DISPLAY UNITS ON REMOTE SYSTEMS (75) Inventors: Amruta Satish Lonkar, Pune (IN); Imtiyaz Altafhussain Khatib, Pune (IN)

(73) Assignee: Nvidia Corporation, Santa Clara, CA (US)

( * ) Notice: Subject to any disclaimer, the term of this patent is extended or adjusted under 35 U.S.C. 154(b) by 497 days.

(21) Appl. No.: 12/277,276

(22) Filed: Nov. 24, 2008

(65) Prior Publication Data

US 2010/0131623 A1    May 27, 2010

(51) Int. Cl.
*G06F 15/177*    (2006.01)
*G06F 15/173*    (2006.01)
*G06F 3/048*     (2013.01)

(52) U.S. Cl.
USPC .............................. 709/221; 709/223; 715/771

(58) Field of Classification Search
USPC .................... 709/220–221, 223; 345/1.1, 2.1; 348/E5.104; 715/771
See application file for complete search history.

(56) References Cited

U.S. PATENT DOCUMENTS

| | | |
|---|---|---|
| 4,603,400 A | 7/1986 | Daniels |
| 4,955,066 A | 9/1990 | Notenboom |
| 5,016,001 A | 5/1991 | Minagawa et al. |
| 5,321,510 A | 6/1994 | Childers et al. |
| 5,371,847 A | 12/1994 | Hargrove |
| 5,461,679 A | 10/1995 | Normile et al. |
| 5,499,334 A | 3/1996 | Staab |
| 5,517,612 A | 5/1996 | Dwin et al. |
| 5,564,002 A | 10/1996 | Brown |
| 5,687,334 A | 11/1997 | Davis et al. |
| 5,689,666 A | 11/1997 | Berquist et al. |
| 5,708,786 A | 1/1998 | Teruuchi |
| 5,712,995 A | 1/1998 | Cohn |
| 5,734,380 A | 3/1998 | Adams et al. |
| 5,768,164 A | 6/1998 | Hollon, Jr. |
| 5,796,403 A | 8/1998 | Adams et al. |
| 5,841,435 A | 11/1998 | Dauerer et al. |
| 5,900,913 A | 5/1999 | Tults |
| 5,920,313 A | 7/1999 | Diedrichsen et al. |
| 5,923,307 A | 7/1999 | Hogle, IV |
| 5,977,973 A | 11/1999 | Sobeski et al. |
| 5,978,042 A | 11/1999 | Vaske et al. |
| 6,003,067 A | 12/1999 | Suzuki et al. |
| 6,008,809 A | 12/1999 | Brooks |
| 6,018,340 A | 1/2000 | Butler et al. |
| 6,075,531 A | 6/2000 | DeStefano |
| 6,133,918 A | 10/2000 | Conrad et al. |
| 6,191,758 B1 | 2/2001 | Lee |

(Continued)

FOREIGN PATENT DOCUMENTS

WO    2005026918    3/2005

OTHER PUBLICATIONS

"Virtual Network Computing", http://en.wikipedia.org/wiki/Vnc, Downloaded Circa: Dec. 18, 2008, pp. 1-4.

(Continued)

*Primary Examiner* — Peling Shaw (57) ABSTRACT

An administrator system provided according to an aspect of the present invention enables the configuration of display properties of display units on remote systems to desired values. In an embodiment, the user can specify the desired values for multiple systems together. The remote systems may further enable the previously configured values of the display properties to be displayed on the administrator system.

20 Claims, 6 Drawing Sheets

(56) References Cited

U.S. PATENT DOCUMENTS

| | | |
|---|---|---|
| 6,226,237 B1 | 5/2001 | Chan et al. |
| 6,335,745 B1 | 1/2002 | Amro et al. |
| 6,337,747 B1 | 1/2002 | Rosenthal |
| 6,433,800 B1 | 8/2002 | Holtz |
| 6,437,803 B1 | 8/2002 | Panasyuk et al. |
| 6,463,459 B1 | 10/2002 | Orr et al. |
| 6,483,502 B2 | 11/2002 | Fujiwara |
| 6,498,721 B1 | 12/2002 | Kim |
| 6,549,217 B1 | 4/2003 | De Greef et al. |
| 6,590,594 B2 | 7/2003 | Bates et al. |
| 6,600,500 B1 | 7/2003 | Yamamoto |
| 6,628,243 B1 | 9/2003 | Lyons et al. |
| 6,630,943 B1 | 10/2003 | Nason et al. |
| 6,633,906 B1 | 10/2003 | Callaway et al. |
| 6,654,826 B1 | 11/2003 | Cho et al. |
| 6,664,983 B2 | 12/2003 | Ludolph |
| 6,686,936 B1 | 2/2004 | Nason et al. |
| 6,710,788 B1 | 3/2004 | Freach et al. |
| 6,710,790 B1 | 3/2004 | Fagioli |
| 6,724,403 B1 | 4/2004 | Santoro et al. |
| 6,774,912 B1 | 8/2004 | Ahmed et al. |
| 6,784,855 B2 | 8/2004 | Matthews et al. |
| 6,816,977 B2 | 11/2004 | Brakmo et al. |
| 6,832,355 B1 | 12/2004 | Duperrouzel et al. |
| 6,873,345 B2 | 3/2005 | Fukuda et al. |
| 6,915,490 B1 | 7/2005 | Ewing |
| 6,956,542 B2 | 10/2005 | Okuley et al. |
| 6,957,395 B1 | 10/2005 | Jobs et al. |
| 7,007,070 B1 | 2/2006 | Hickman |
| 7,010,755 B2 | 3/2006 | Anderson et al. |
| 7,030,837 B1 | 4/2006 | Vong et al. |
| 7,034,776 B1 | 4/2006 | Love |
| 7,047,500 B2 | 5/2006 | Roelofs |
| 7,124,360 B1 | 10/2006 | Drenttel et al. |
| 7,129,909 B1 | 10/2006 | Dong et al. |
| 7,159,189 B1 | 1/2007 | Weingart et al. |
| 7,171,622 B2 | 1/2007 | Bhogal |
| 7,212,174 B2 | 5/2007 | Johnston et al. |
| 7,269,797 B1 | 9/2007 | Bertocci et al. |
| 7,346,855 B2 | 3/2008 | Hellyar et al. |
| 7,359,998 B2 | 4/2008 | Chan et al. |
| 7,370,284 B2 | 5/2008 | Andrea et al. |
| 7,461,088 B2 | 12/2008 | Thorman et al. |
| 7,486,279 B2 | 2/2009 | Wong et al. |
| 7,490,297 B2 | 2/2009 | Bates et al. |
| 7,509,444 B2 | 3/2009 | Chiu et al. |
| 7,519,910 B2 | 4/2009 | Saka |
| 7,523,414 B2 | 4/2009 | Schmidt et al. |
| 7,552,391 B2 | 6/2009 | Evans et al. |
| 7,555,528 B2 | 6/2009 | Rezvani et al. |
| 7,558,884 B2 | 7/2009 | Fuller et al. |
| 7,594,185 B2 | 9/2009 | Anderson et al. |
| 7,612,783 B2 | 11/2009 | Koduri et al. |
| 7,698,360 B2 | 4/2010 | Rowley et al. |
| 7,739,604 B1 | 6/2010 | Lyons et al. |
| 7,739,617 B2 | 6/2010 | Ording et al. |
| 7,913,183 B2 | 3/2011 | Czerwinski et al. |
| 7,953,657 B2 | 5/2011 | West |
| 7,996,785 B2 | 8/2011 | Neil |
| 7,996,789 B2 | 8/2011 | Louch et al. |
| 8,176,155 B2 | 5/2012 | Yang et al. |
| 8,190,998 B2 | 5/2012 | Bitterlich |
| 8,743,019 B1 | 6/2014 | Eng |
| 2001/0028366 A1 | 10/2001 | Ohki et al. |
| 2002/0054141 A1 | 5/2002 | Yen et al. |
| 2002/0057295 A1 | 5/2002 | Panasyuk et al. |
| 2002/0087225 A1 | 7/2002 | Howard |
| 2002/0129288 A1 | 9/2002 | Loh et al. |
| 2002/0140627 A1 | 10/2002 | Ohki et al. |
| 2002/0163513 A1 | 11/2002 | Tsuji |
| 2002/0175933 A1 | 11/2002 | Ronkainen et al. |
| 2002/0186257 A1 | 12/2002 | Cadiz et al. |
| 2002/0196279 A1 | 12/2002 | Bloomfield et al. |
| 2003/0016205 A1 | 1/2003 | Kawabata et al. |
| 2003/0025689 A1 | 2/2003 | Kim |
| 2003/0041206 A1 | 2/2003 | Dickie |
| 2003/0065934 A1 | 4/2003 | Angelo et al. |
| 2003/0088800 A1 | 5/2003 | Cai |
| 2003/0090508 A1 | 5/2003 | Keohane et al. |
| 2003/0126335 A1 | 7/2003 | Silvester |
| 2003/0177172 A1 | 9/2003 | Duursma et al. |
| 2003/0179240 A1 | 9/2003 | Gest |
| 2003/0179244 A1 | 9/2003 | Erlingsson |
| 2003/0188144 A1 | 10/2003 | Du et al. |
| 2003/0189597 A1 | 10/2003 | Anderson et al. |
| 2003/0195950 A1 | 10/2003 | Huang et al. |
| 2003/0197739 A1 | 10/2003 | Bauer |
| 2003/0222876 A1 | 12/2003 | Giemborek et al. |
| 2003/0225872 A1 | 12/2003 | Bartek et al. |
| 2004/0019724 A1 | 1/2004 | Singleton, Jr. et al. |
| 2004/0027315 A1 | 2/2004 | Senda et al. |
| 2004/0066414 A1 | 4/2004 | Czerwinski et al. |
| 2004/0070608 A1 | 4/2004 | Saka |
| 2004/0080482 A1 | 4/2004 | Magendanz et al. |
| 2004/0085328 A1 | 5/2004 | Maruyama et al. |
| 2004/0153493 A1 | 8/2004 | Slavin et al. |
| 2004/0184523 A1 | 9/2004 | Dawson et al. |
| 2004/0222978 A1 | 11/2004 | Bear et al. |
| 2004/0224638 A1 | 11/2004 | Fadell et al. |
| 2004/0225901 A1 | 11/2004 | Bear et al. |
| 2004/0225907 A1 | 11/2004 | Jain et al. |
| 2004/0235532 A1 | 11/2004 | Matthews et al. |
| 2004/0268004 A1 | 12/2004 | Oakley |
| 2005/0025071 A1* | 2/2005 | Miyake et al. ................ 370/254 |
| 2005/0059346 A1 | 3/2005 | Gupta et al. |
| 2005/0064911 A1 | 3/2005 | Chen et al. |
| 2005/0066209 A1 | 3/2005 | Kee et al. |
| 2005/0076088 A1 | 4/2005 | Kee et al. |
| 2005/0076256 A1 | 4/2005 | Fleck et al. |
| 2005/0091610 A1 | 4/2005 | Frei et al. |
| 2005/0097506 A1 | 5/2005 | Heumesser |
| 2005/0125739 A1 | 6/2005 | Thompson et al. |
| 2005/0132299 A1 | 6/2005 | Jones et al. |
| 2005/0140566 A1 | 6/2005 | Kim et al. |
| 2005/0182980 A1 | 8/2005 | Sutardja |
| 2005/0240538 A1* | 10/2005 | Ranganathan ................ 705/400 |
| 2005/0240873 A1 | 10/2005 | Czerwinski et al. |
| 2005/0262302 A1 | 11/2005 | Fuller et al. |
| 2005/0268246 A1 | 12/2005 | Keohane et al. |
| 2006/0001595 A1* | 1/2006 | Aoki ............................ 345/1.2 |
| 2006/0007051 A1 | 1/2006 | Bear et al. |
| 2006/0085760 A1 | 4/2006 | Anderson et al. |
| 2006/0095617 A1 | 5/2006 | Hung |
| 2006/0119537 A1 | 6/2006 | Vong et al. |
| 2006/0119538 A1 | 6/2006 | Vong et al. |
| 2006/0119602 A1* | 6/2006 | Fisher et al. .................. 345/441 |
| 2006/0125784 A1 | 6/2006 | Jang et al. |
| 2006/0129855 A1 | 6/2006 | Rhoten et al. |
| 2006/0130075 A1 | 6/2006 | Rhoten et al. |
| 2006/0142878 A1 | 6/2006 | Banik et al. |
| 2006/0150230 A1 | 7/2006 | Chung et al. |
| 2006/0164324 A1 | 7/2006 | Polivy et al. |
| 2006/0232494 A1 | 10/2006 | Lund et al. |
| 2006/0250320 A1 | 11/2006 | Fuller et al. |
| 2006/0267857 A1* | 11/2006 | Zhang et al. ................. 345/1.1 |
| 2006/0267987 A1 | 11/2006 | Litchmanov |
| 2006/0267992 A1 | 11/2006 | Kelley et al. |
| 2006/0282855 A1* | 12/2006 | Margulis ........................ 725/43 |
| 2007/0046562 A1 | 3/2007 | Polivy et al. |
| 2007/0052615 A1* | 3/2007 | Van Dongen et al. ......... 345/1.1 |
| 2007/0067655 A1 | 3/2007 | Shuster |
| 2007/0079030 A1 | 4/2007 | Okuley et al. |
| 2007/0083785 A1 | 4/2007 | Sutardja |
| 2007/0103383 A1 | 5/2007 | Sposato et al. |
| 2007/0195007 A1 | 8/2007 | Bear et al. |
| 2007/0273699 A1 | 11/2007 | Sasaki et al. |
| 2008/0034318 A1 | 2/2008 | Louch et al. |
| 2008/0130543 A1 | 6/2008 | Singh et al. |
| 2008/0155478 A1* | 6/2008 | Stross ........................... 715/849 |
| 2008/0172626 A1 | 7/2008 | Wu |
| 2008/0297433 A1 | 12/2008 | Heller et al. |
| 2008/0320321 A1 | 12/2008 | Sutardja |
| 2009/0021450 A1 | 1/2009 | Heller et al. |
| 2009/0031329 A1 | 1/2009 | Kim |

(56) References Cited

U.S. PATENT DOCUMENTS

| | | |
|---|---|---|
| 2009/0059496 A1 | 3/2009 | Lee |
| 2009/0160865 A1 | 6/2009 | Grossman |
| 2009/0172450 A1 | 7/2009 | Wong et al. |
| 2009/0193243 A1 | 7/2009 | Ely |
| 2010/0010653 A1 | 1/2010 | Bear et al. |
| 2010/0033433 A1 | 2/2010 | Utz et al. |
| 2010/0033916 A1 | 2/2010 | Douglas et al. |
| 2011/0219313 A1 | 9/2011 | Mazzaferri |

OTHER PUBLICATIONS

Non-Final Office Action Date Mailed Aug. 9, 2005; U.S. Appl. No. 10/423,387.
Final Office Action Date Mailed Feb. 7, 2006; U.S. Appl. No. 10/423,387.
Non-Final Office Action Mail Date Jan. 26, 2007; U.S. Appl. No. 10/733,026.
Final Office Action Mail Date Jul. 25, 2007; U.S. Appl. No. 10/733,026.
Non-Final Office Action Mail Date Jan. 3, 2008; U.S. Appl. No. 10/733,026.
Final Office Action Mail Date Jul. 24, 2008; U.S. Appl. No. 10/733,026.
Non-Final Office Action Mail Date Jun. 20, 2012; U.S. Appl. No. 10/733,026.
Final Office Action Mail Date Oct. 2, 2012; U.S. Appl. No. 10/733,026.
Non-Final Office Action Mail Date May 26, 2009; U.S. Appl. No. 11/398,167.
Final Office Action Mail Date Nov. 20, 2009; U.S. Appl. No. 11/398,167.
Non-Final Office Action Mail Date Apr. 14, 2010; U.S. Appl. No. 11/398,167.
Final Office Action Mail Date Sep. 20, 2010; U.S. Appl. No. 11/398,167.
Non-Final Office Action Mail Date Apr. 8, 2011; U.S. Appl. No. 11/398,167.
Final Office Action Mail Date Oct. 18, 2011; U.S. Appl. No. 11/398,167.
Non-Final Office Action Mail Date Apr. 27, 2012; U.S. Appl. No. 11/398,167.
Final Office Action Mail Date Dec. 5, 2012; U.S. Appl. No. 11/398,167.
Andrew Fuller; "Auxiliary Display Platform in Longhorn"; Microsoft Corporation; The Microsoft Hardware Engineering Conference Apr. 25-27, 2005; slides 1-29.
Vulcan, Inc., "Product Features: Size and performance", p. 1; downloaded from the internet on Sep. 20, 2005 from http://www.flipstartpc.com/aboutproduct_features_sizeandpower.asp.
Vulcan, Inc., "Product Features:LID Module", p. 1, downloaded from the Internet on Sep. 19, 2005 from http://www.flipstartpc.com/aboutproduct_features_lidmodule.asp.
Vulcan, Inc., "Software FAQ", p. 1, downloaded from the internet on Sep. 20, 2005 from http://www.flipstartpc.com/faq_software.asp.
Epson: EMP Monitor V4.10 Operation Guide, by Seiko Epson Corp., 2006, http://support.epson.ru/products/manuals/100396/Manual/EMPMonitor.pdf.
PCWorld.com, "Microsoft Pitches Display for Laptop Lids" dated Feb. 10, 2005, pp. 1-2, downloaded from the Internet on Mar. 8, 2006 from http://www.pcworld.com/resources/article/aid/119644.asp.
McFedries, ebook, titled "Complete Idiot's Guide to Windows XP", published Oct. 3, 2001, pp. 1-7.
Paul Thurrot's SuperSite for Windows, "WinHEC 2004 Longhorn Prototypes Gallery", dated May 10, 2004, pp. 1-4, downloaded from the internet on Sep. 15, 2005 from http://www.sinwupersite.com/showcase.loghorn_winhc_proto.asp.
Vulcan Inc., "Connectivity FAQ", p. 1, downloaded from the internet on Sep. 20, 2005 from http://www.flipstartpc.com/faq_connectivity.asp.
Handtops.com, "FlipStart PC in Detail" pp. 1-4, downloaded from the internet on Sep. 20, 2005 from http://www.handtops.com/show/news/5.
Graphics: Intel® 82852/82855 Graphics Controller Family, Intel, Archived Nov. 2, 2006 by archive.org, Downloaded Jun. 30, 2011, http://web.archive.org/web/20061103045644/http://www.intel.com/support/graphics/intel852gm/sb/CS-009064.htm?.
"Usage: NVIDIA GeForce 6800—PCIe x16", Dell, archived Jan. 15, 2006 by archive.org, Downloaded Jun. 29, 2011, http://web.archive.org/web/20060115050119/http://support.dell.com/support/edocs/video/P82192/en/usage.htm.

* cited by examiner

CONFIGURING DISPLAY PROPERTIES OF DISPLAY UNITS ON REMOTE SYSTEMS

BACKGROUND OF THE INVENTION

1. Technical Field

The present disclosure relates to displays and more specifically to configuring display properties of display units on remote systems.

2. Related Art

A display unit refers to a device associated with a digital processing system, which can present/render (visual) images on a display screen that forms part of the display unit. A display unit generally renders images based on the image/video/control data sent from the corresponding digital processing system. Example of display units includes CRT monitors, LCD displays, etc.

Display properties control the specific manner in which images are displayed on one or more display units associated with a digital processing system. Examples of display properties include resolution indicating the number of pixels to be used in the display screen, refresh rate, custom resolutions, luminosity indicating the brightness/contrast of the pixels, color, adjusting screen size and position, display rotation, dots per inch, hue, saturation, gamma, video color settings (gamma, dynamic range, etc.), video image settings (edge enhancement and noise reduction), 3D settings (anti-aliasing, texture filtering, vertical sync, triple buffering, etc.), etc.

Configuring of display properties entails associating a desired value to a specific display property. In a prior approach, a user using a digital processing system configures display properties of one or more display units (associated with the digital processing system) by using appropriate user interfaces (display as well as input ability using components such as keyboards and mouse) provided by the specific operating environment of the same digital processing system.

For example, in Windows Operating System provided by Microsoft Corporation, a user typically accesses display properties from a desk top screen, and set desired values for display properties such as screen resolution, color quality (number of bits to be used for each pixel), dots per inch, etc. In a typical use case, the display unit and digital processing system are together in a same physical location/proximity and a user also is physically located in the same place to perform the desired configurations.

There is often a need to provide similar user interfaces for configuring display properties of multiple display units associated with remote systems. Remote systems are digital processing systems which are accessible on a network from another digital processing system used by a user. At least in view of the potentially long physical distance to remote systems, there is a general need to simplify configuration of display properties of display units on remote systems.

BRIEF DESCRIPTION OF THE DRAWINGS

Example embodiments of the present invention will be described with reference to the accompanying drawings briefly described below.

In the drawings, like reference numbers generally indicate identical, functionally similar, and/or structurally similar elements. The drawing in which an element first appears is indicated by the leftmost digit(s) in the corresponding reference number.

DESCRIPTION OF EXAMPLE EMBODIMENTS

1. Overview

An administrator system provided according to an aspect of the present invention enables configuration of display properties of display unit on a remote system to desired values. In an embodiment, a suitable interface is provided using a display unit associated with the administrator system, to facilitate such configuration. The administrator system then sends packets on a network, which are designed to cause the requested configuration changes. The display properties of remote systems can thus be conveniently configured from distant locations.

According to another aspect of the present invention, the user can specify the desired values for multiple systems together. As a result, a group of systems can be configured conveniently without the same approach being repeated for individual systems.

According to yet another aspect of the present invention, a remote system may further enable the previously configured values of the display properties to be displayed on the administrator system. In an embodiment, the administrator system sends a request for the current values and the remote system provides the values in response. The administrator system thereafter displays the received values.

Several aspects of the invention are described below with reference to examples for illustration. However one skilled in the relevant art will recognize that the invention can be practiced without one or more of the specific details or with other methods, components, materials and so forth. In other instances, well-known structures, materials, or operations are not shown in detail to avoid obscuring the features of the invention. Furthermore the features/aspects described can be practiced in various combinations, though only some of the combinations are described herein for conciseness.

2. Example Environment

Figure 1:
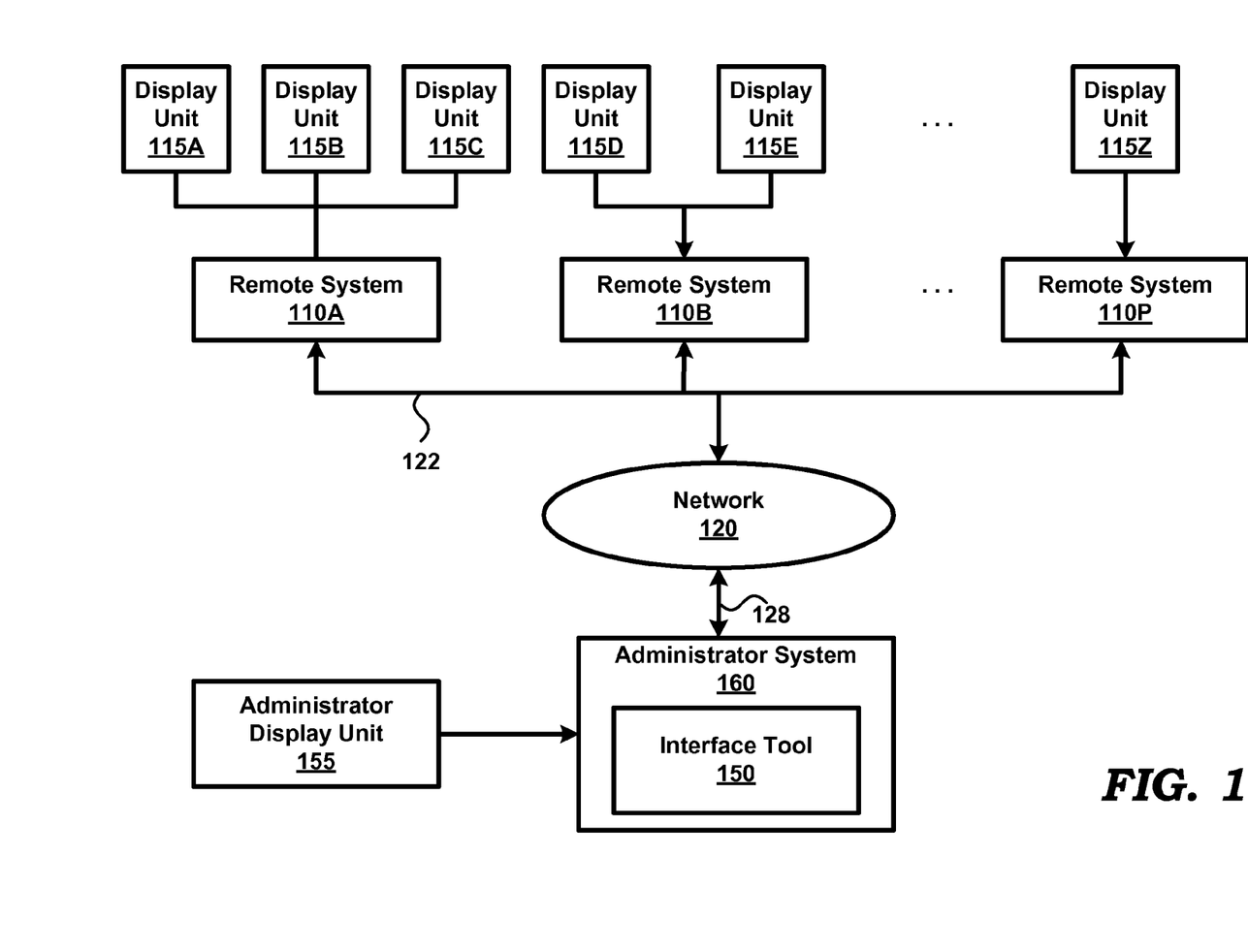
FIG. 1 is a block diagram illustrating the details of an example computing system in which several aspects of the present invention can be implemented.

FIG. 1 is a block diagram illustrating an example environment (computing system) in which several aspects of the present invention can be implemented. The example environment may correspond to a digital/film/special effects studio, where a large number of designers/ developers cooperatively create desired audio/video/media information such as films, advertisements, animations etc. However, the features of the invention can be implemented in other types/sizes of environments, as will be apparent to one skilled in the relevant arts by reading the disclosure provided herein.

The block diagram is shown containing remote systems 110A-110P, display units 115A-115Z, network 120, interface tool 150, and administrator (admin) system 160 associated with administrator (admin) display unit 155. Merely for illustration, only representative number/type of systems is shown in the Figure. Many environments often contain many more systems, both in number and type, depending on the purpose for which the environment is designed. Each system/device of FIG. 1 is described below in further detail.

Network 120 provides connectivity between remote systems 110A-110P, and admin system 160. Network 120 may be implemented using protocols such as Internet Protocol (IP) well known in the relevant arts. In general, in IP environments, an IP packet is used as a basic unit of transport, with the source address being set to the IP address assigned to the source system from which the packet originates and the destination address set to the IP address of the target system to which the packet is to be eventually delivered.

Each of remote systems 110A-110P represents a system such as a personal computer, workstation, server, mobile station etc., which provides the video/image data to be rendered on one or more associated display units. Each remote system also enables configuring of the display properties of the associated display units using appropriate user interfaces provided based on one or more associated/local display units. Thus, the display properties of local display units 115A-115C can be configured by a user at remote system 110A.

For example, remote system 110A is shown associated with display units 115A-115C indicating that remote system 110A provides the data to be rendered on display units 115A-115C. Further, the display properties of display units 115A-115C can be configured by a user using appropriate user interfaces provided by remote system 110A based on one or more of display units 115A-115C. Other remote systems may be similarly associated with one or more display units such as remote system 110P shown associated with display unit 115Z and may provide the functionalities described above.

Admin system 160 represents a system such as a personal computer, workstation, server, mobile station, etc., which provides the data to be rendered and enables configuration of the display properties of the associated admin display unit 155 (local display unit). The configuration of the local display unit may be performed using user interfaces provided based on admin display unit 155 as described above in the Background Section.

In a typical studio environment, the remote systems and the admin systems are maintained in a central location (accessible only to authorized users such as administrators), while the multiple display units are distributed over multiple locations/floors categorized by the specific function such as texturing, rendering etc performed by the designers/users.

Users at different locations often work together on the same project (film, advertisement, animation, etc) thereby necessitating that display properties of multiple display units of different locations to be configured differently according to the project requirements. Furthermore, as the nature of projects changes, there is often a need to readjust the display properties on the remote display units (e.g., display units 115A-115Z when sought to be configured from administrator system 160).

Thus, it may be desirable that an administrator using admin system 160 be provided the ability to configure display properties of display units 115A-115Z associated with remote systems 110A-110P.

Various aspects of the present invention enable users (using admin system 160) to configure display properties of multiple display units (115A-115Z) on remote systems (110A-110P) as described below with examples. In one embodiment, such features are operative by execution of software instructions constituting interface tool 150, and accordingly the description below is provided with respect to interface tool 150.

3. Configuring Display Properties of a Display Unit on a Remote System

Figure 2:
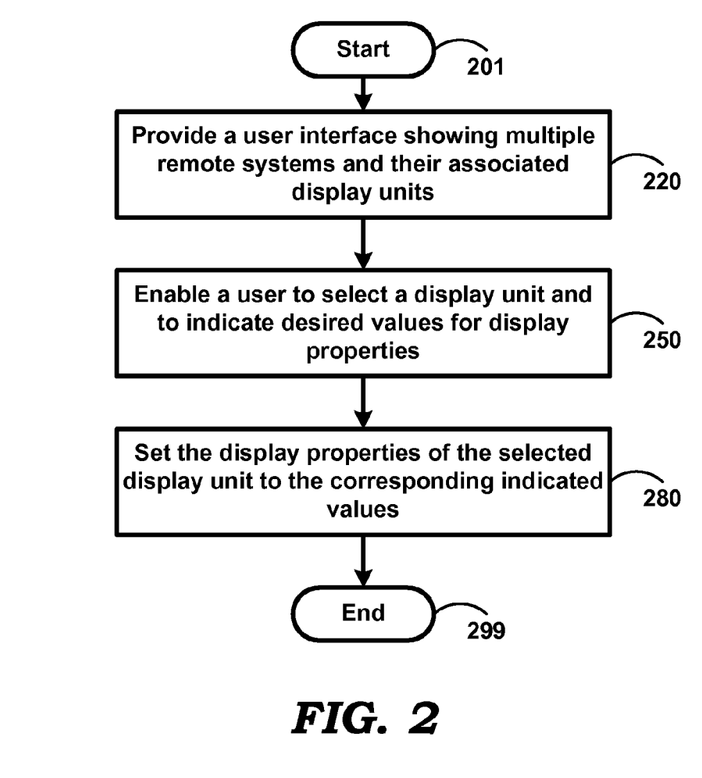
FIG. 2 is a flow chart illustrating the manner in which the display properties of a display unit on a remote system are configured according to an aspect of the present invention.

FIG. 2 depicts a flow chart illustrating the manner in which display properties of a display unit (e.g. 115A) associated with a remote system (e.g. 110A) are configured according to an aspect of the present invention. The flowchart is described with respect to FIG. 1 merely for illustration. However, various features can be implemented in other environments also without departing from the scope and spirit of various aspects of the present invention, as will be apparent to one skilled in the relevant arts by reading the disclosure provided herein.

In addition, some of the steps may be performed in a different sequence than that depicted below, as suited to the specific environment, as will be apparent to one skilled in the relevant arts. Many of such implementations are contemplated to be covered by several aspects of the present invention. The flow chart begins in step 201, in which control immediately passes to step 220.

In step 220, interface tool 150 provides a user interface (on admin display unit 155 associated with admin system 160) showing (synonymous with displaying) multiple remote systems and their associated display units. The user interface may be provided in response to receiving a corresponding indication (e.g., selection/clicking of an appropriate displayed icon) from a user using input devices (such as keyboard and/or mouse) associated with admin system 160.

The displayed user interface may contain a list of the identifiers (for example, name, IP address, etc.) of remote systems 110A-110P and also identifiers (for example, "Display 1", "Display 2", etc.) of the associated display units 115A-115Z. The list of identifiers of the remote systems and display units may be provided in the form of text or as a graphical representation using appropriate icons for the remote systems/display units.

The user interface may be generated by interface tool 150 based on pre-defined data or using an appropriate program logic for determining/discovering the remote systems connected to a network as will be apparent to one skilled in the relevant arts.

In step 250, interface tool 150 enables a user to select a display unit (e.g., 115A) associated with a remote system (e.g., 110A) and to indicate desired values for display properties (of the selected display unit) from the user interface provided. Selection of a display unit entails specifying the unit using a suitable convention (e.g., by name, IP address, clicking on an icon, etc.) and the desired values can also be indicated by a suitable convention.

In step 280, interface tool 150 sets the display properties of the selected display unit 115A to the corresponding indicated values (provided by the user in step 250). In general, such setting entails storing the indicated values at appropriate memory locations such that further rendering of images is controlled according to the values. In case such memory locations are in remote system 110A, the setting of the display property to the indicated value may be performed, for example, by sending appropriate requests to the remote system (110A) associated with the selected display unit (115A).

Thus, a user using admin system 160 may configure display properties of a selected display unit (115A) associated with a remote system (110A). The images are thereafter rendered according to the new configuration on the remote display units. The flow chart ends in step 299.

While the description above is provided with respect to configuring the display properties of a single display unit, the features can be extended to configure the display properties of multiple display units associated with one or more remote systems. An aspect of the present invention provides for the configuring of display properties of multiple display units associated with one or more remote systems as described below with examples.

4. Configuring Display Properties of Multiple Display Units on Remote Systems

Figure 3:
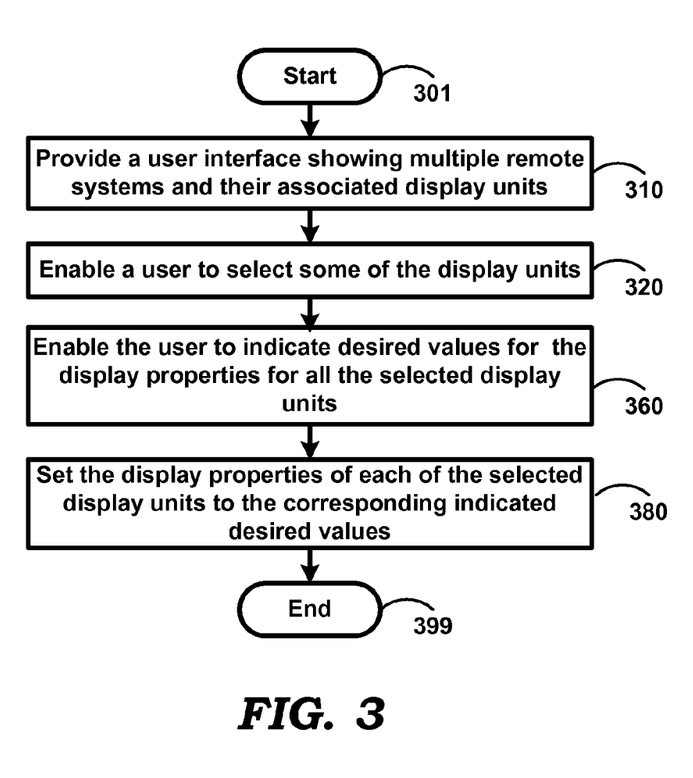
FIG. 3 is a flow chart illustrating the manner in which the display properties of multiple display units on remote systems are configured according to another aspect of the present invention.

FIG. 3 depicts a flow chart illustrating the manner in which display properties of multiple display units on remote systems is configured according to an aspect of the present invention. The flowchart is described with respect to FIG. 1 merely for illustration. However, various features can be implemented in other environments also without departing from the scope and spirit of various aspects of the present invention, as will be apparent to one skilled in the relevant arts by reading the disclosure provided herein.

In addition, some of the steps may be performed in a different sequence than that depicted below, as suited to the specific environment, as will be apparent to one skilled in the relevant arts. Many of such implementations are contemplated to be covered by several aspects of the present invention. The flow chart begins in step 301, in which control immediately passes to step 310.

In step 310, interface tool 150 provides a user interface showing multiple remote systems (110A-110P) and their associated display units (115A-115Z). The user interface may be provided on admin display unit 155 similar to user interface described above with respect to step 220 and accordingly the description is not repeated here for conciseness.

In step 320, interface tool 150 enables a user to select some of the display units from the user interface shown step 310. The selected display units may represent the display units whose display properties are desired to be configured. The selection of the desired display units may be performed similar to the selection of the single display unit described above with respect to step 250.

Additional features may also be provided in the user interface for selecting multiple display units. For example, when a remote system is selected from the user interface, all of the display units associated with the selected remote system may also be selected.

In step 360, interface tool 150 enables the user to indicate desired values for the display properties for all the selected display units together. The term "together" means that the values are not being specified for each individually (sequentially), rather in a single set of actions the indicated values are made applicable to all the display units. The desired values may be indicated using a combination of input devices (such as keyboard or mouse) based on the representation of the corresponding display properties in the user interface.

In step 380, interface tool 150 sets the display properties of each of the selected display units to the corresponding indicated desired values. The setting of the display properties to the indicated desired values may be performed similar to step 280 described above with respect to FIG. 2. For example, the actions of step 280 may be performed in an iterative manner for each of the selected display units for setting the corresponding display properties to the desired values. The flow chart ends in step 399.

Thus, an user/administrator is provided the ability to configure the display properties of multiple display unit associated with one or more remote systems using user interfaces similar to the one provide for the local display unit. The manner in which such a user interface is provided in one embodiment is described below with examples.

5. Example User Interface

Figure 4:
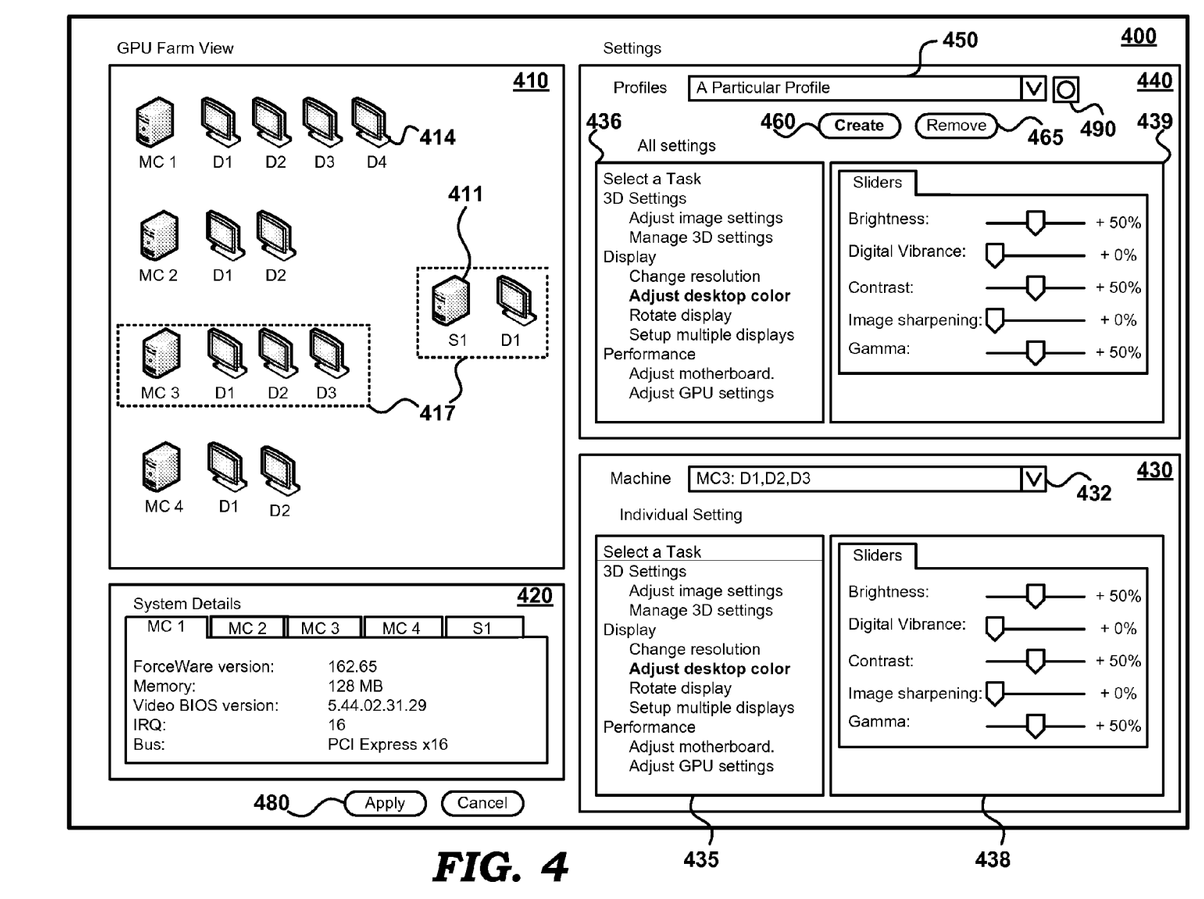
FIG. 4 is a screen shot on a display unit illustrating an example user interface using which the display properties of multiple display units on remote systems are configured in an embodiment of the present invention.

FIG. 4 depicts a portion of a user interface provided to configure display properties of multiple display units on remote systems in one embodiment. It may be observed that the user interface is shown as being provided in a graphical representation. However, in alternative embodiments, the user interface may be provided in a textual representation or a combination of text/graphical representation as will be apparent to one skilled in the relevant arts by reading the disclosure provided herein.

Display area 400 represents a portion of the graphical user interface provided in a display unit (such as admin display unit 155) associated with admin system 160. A user may provide the required inputs/selection (as described below) using an input device (such as keyboard and/or mouse) associated with admin system 160.

Display area 410 depicts icons representing remote systems (similar to icon 411) and associated display units (similar to icon 414) according to step 310 of FIG. 3 described above. The remote systems and display units shown in display area 410 may respectively correspond to any of remote systems 110A-110P and display units 115A-115Z, though only some of the systems/display units are shown here for conciseness. Thus in a studio environment, display area 410 may depict the centrally located remote systems and the associated display units that are distributed over multiple locations/floors.

Display area 410 also depicts the identifiers/names of each of the remote systems (e.g., "MC1", "MC2", "MC3", "MC4", "S1" etc.) and the associated display units (e.g., "D1", "D2", "D3", "D4" etc., for MC1) with the corresponding icons. The icons representing each remote system and its associated display units are shown together to indicate to the user that the display units are associated with the corresponding remote system. Other representations such as lines/arrows, boxes, colors, etc., may also be used to indicate the association of the display units and the remote systems.

The dotted boundaries 417 indicate the remote systems (MC3, S1) and associated display units (hereafter referred to as MC3-D1, MC3-D2, MC3-D3, S1-D1 for convenience) selected by a user according to step 320. As described above, the remote systems/display units may be selected to view/configure the corresponding display properties. In particular with respect to a studio environment, the selection may represent display units used by designers/users at different locations working on a single project.

Display area 420 depicts the system details of all/selected remote systems (such as 110A-110P) in a tabbed manner, with each remote system represented as a corresponding tab (having the identifier/name as the label). A user may view the details of the desired remote system by selecting the appropriate tab. Tab labeled MC1 is shown selected and accordingly display area 420 depicts the details (such as the graphical operating system, the amount of memory, the video BIOS version, etc.) of the remote system identified by MC1. Other details such as the type/make of the display units, the amount of free memory, the number of processors, the speed of each processor (CPU/GPU), etc. may also be shown in display are 420.

Display area 430 depicts current values of various display properties of display units associated with a remote system. A user/administrator may select a specific remote system of interest (such as MC3) from the list of remote systems provided in select field 432. In response to the selection, the current values of the display properties of the associated display units (MC3-D1, MC3-D2, and MC3-D3) may be retrieved from appropriate memory locations and shown in display area 438. For convenience, the display properties required for performing a specific task (e.g. "Adjust Desktop Settings") based on the user selection in task list 435 are shown in display area 438.

Though not shown, the user may view in display area 430, the properties of all the selected display units in area 410. If all the selected display units have the same value for a property, the value for that property is displayed in area 430. When there are conflicting or different values for the same display property in different display units, the conflict may be shown using a pre-defined notation, such as a blank value in a text field, a colored icon near a slider to indicate conflict, etc.

Display area 440 enables the display properties of all selected display units to be configured using various profiles shown with list tool 450. Each profile contains a corresponding set of values for display properties. Thus, when a profile is selected from list tool 450, the corresponding values are displayed in area 439 (for the specific task selected in area 436). The user may choose to further modify the values in area 439.

Button 460 (labeled "Create") enables a user to create a new display profile containing the values specified in display area 440. Button 465 (labeled "Remove") enables a user to remove/delete a desired profile selected from the list of available display profiles provided in select field 450. Selection of a desired profile in select field 450 causes the corresponding set of values to be displayed in display area 440.

Button 480 (labeled "Apply") enables a user to set the display properties of all the selected display units together to the corresponding indicated desired/modified values (as per step 380), thereby causing the selected display units (such as MC3-D1, S1-D1 etc.) to use the indicated values for further rendering of images. As the user is not specifying the same values for the systems individually, the aggregate time to complete configuration of display properties of many systems (particularly in large environments) is substantially reduced due to an aspect of the present invention.

Whip tool 490 provides an alternative/convenient method of applying display properties to one or more display units. A user first specifies the desired values, clicks/selects whip tool 490 and then selects the display units for which the display properties are sought to be set to the desired values. The user then applies/sets the changes by selecting apply button 480.

Thus, a user using the interface of display area 400 is enabled to configure display properties of multiple display units associated with one or more remote systems.

The features described above can be implemented using various approaches. The description is continued with respect to implementation of a remote system, followed by the implementation of an administrator system (executing interface tool 150) in one embodiment.

6. Remote System

Figure 5A:
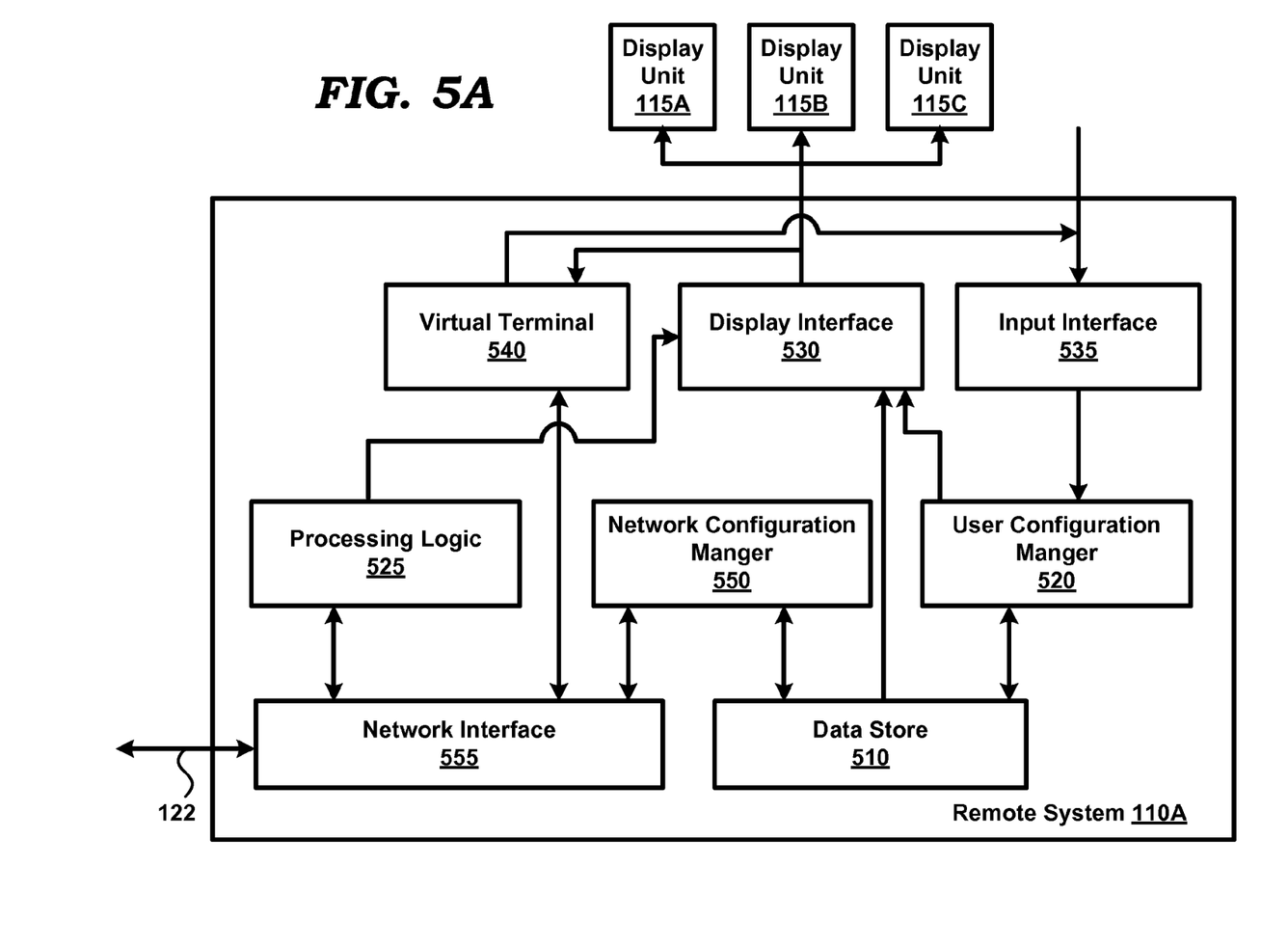
FIG. 5A is a block diagram illustrating the details of a remote system in an embodiment of the present invention.

FIG. 5A is a block diagram of a remote system in one embodiment. For illustration, only the implementation of remote system 110A is described below. Other remote systems such as 110B-110P (associated with one or more display units 115D-115Z) may be similarly implemented, as will be apparent to one skilled in the relevant arts by reading the disclosure herein.

Remote system 110A is shown containing data store 510, user configuration manager 520, processing logic 525, display interface 530 connected to display units 115A-115C, input interface 535, virtual terminal interface 540, network configuration manager 550 and network interface 555. For illustration, only representative blocks (in type and number) are shown, though alternative embodiments in accordance with several aspects of the present invention can contain other blocks. Each block is described in detail below.

Processing logic 525 generates data representing image frames to be displayed. Processing logic 525 generally refers to various utilities (including user applications, shared operating environment for the user applications, etc.) provided by a central processing unit that are not shown in the remaining blocks of FIG. 5A.

Input interface 535 provides the appropriate physical, electrical and protocol interfaces to receive inputs from various input components (such as key board, pointer devices, etc.) associated with the remote system. It will be clear from the disclosure herein that the input components (and the display unit as well) associated with the remote system are not used in configuring the display properties, when the administrator system 160 is used for the same purpose according to several aspects of the present invention.

Data store 510 represents a volatile storage (such as RAM) or a non-volatile storage (such as a hard disk) storing values corresponding to the display properties of the associated display units 115A-115C. When values are provided according to the interface of FIG. 4 above, the changed values may be stored in data store 510.

Display interface 530 generates display signals (e.g., in RGB format) to display units 115A-115C based on the image frames received from processing block 525. Further, display interface 530 controls the manner in which data is rendered based on the values of the display properties stored in data store 510.

In an embodiment, display interface 530 is implemented using GeForce® 8300 GS Graphics Processing Unit (GPU) available from NVIDIA® Corporation, the assignee of the subject patent application. In such an embodiment, all the display properties that are controlled locally from a desktop are controlled from administrator systems according to several aspects of the present invention. Thus, the administrator specified values are stored in data store 510 and the GPU.

User configuration manager 520 enables a local user (using remote system 110A) to configure the display properties of the associated display units 115A-115C. On receiving a modify indication via input interface 535 (which forwards inputs received from input devices used by a user), user configuration manager 520 provides an appropriate user interface (by interfacing with processing logic 525, though the connection is not shown in the Figure) for configuring the display properties on one of display units 115A-115C (via display interface 530). User configuration manager 520 then receives the user-indicated values corresponding to the display properties and overwrites the preexisting (previous configured) values in data store 510, thereby causing further rendering of images on display units 115A-115C to be based on the user-indicated values.

Virtual terminal interface 540 provides a virtual terminal/desktop (via network interface 555) to users using another system such as admin system 160 connected to network 120. A virtual terminal/desktop may be provided in response to establishing a virtual network computing (VNC) connection from admin system 160 to remote system 110A, as is well known in the relevant arts.

Virtual terminal interface 540 sends the output of display interface 530 (corresponding to one of display units 115A-115C) to admin system 160 via network interface 555. Virtual terminal interface 540 then forwards the inputs from the user using the virtual terminal/desktop (received via network interface 555) to input interface 535. Thus, the virtual terminal/desktop provided to the user is a replica of the user interface displayed in one of display units 115A-115C.

The user may configure the display properties of the replicated display unit (i.e., one of 115A-115C) using the virtual terminal/desktop provided on admin display unit 155 (associated with admin system 160). For example, the user may send a modify indication to virtual terminal interface 540 and then indicate the desired values for the display properties in the user interface provided.

It may be noted that the user interface provided for indicating the desired values for the display properties in virtual terminal/desktop would be similar to the user interface provided by user configuration manager 520 on one of display units 115A-115C. Furthermore, using VNC from administrator system 160, only one remote system can be configured at a given time.

Network configuration manager 550, provided according to several aspects of the present invention, enables a user to configure display properties of display units 115A-115C from another system such as admin system 160. The block may be implemented in a desired combination of hardware, software and firmware, as suited in the specific environments.

In response to receiving requests (via network interface 555) from admin system 160 for information such as the system details of remote system 110A, the current values of the display properties for display units 115A-115C etc, network configuration manager 550 determines the requested details and/or retrieves the information from data store 510 and then sends corresponding responses containing the requested details via network 120 using network interface 555.

The requests may indicate the specific display units (such as 115A) or may be a general list of display units, with network configuration manager 550 determining the specific display units (115A-115C) for which the display properties are available in remote system 110A.

Network configuration manager 550 further receives requests (via network interface 555) containing the modified values of the display properties, and then sets the display properties in data store 510 to the corresponding modified values (by overwriting the current values).

Thus, network configuration manager 550 enables users to configure the display properties of display units 115A-115C using another system such as admin system 160. In general, the implementation of administrator system 160 needs to be consistent with the implementation of remote systems (in particular the operation of network configuration manager 550). The manner in which an administrator system (such as admin system 160) is implemented in one embodiment is described below with examples.

7. Administrator System

Figure 5B:
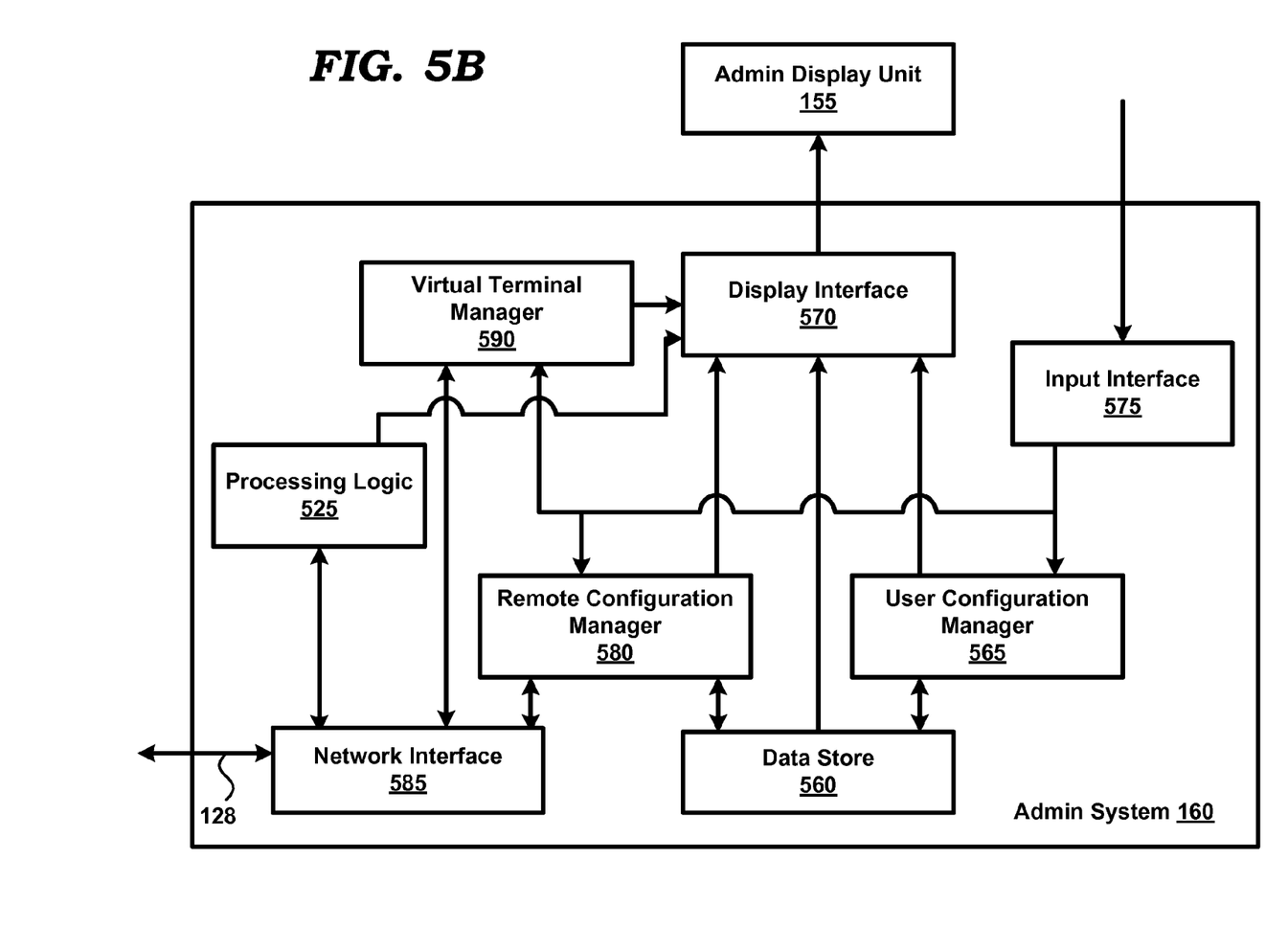
FIG. 5B is a block diagram illustrating the details of an administrator system in an embodiment of the present invention.

FIG. 5B is a block diagram of an administrator system (160) in one embodiment. Admin system 160 is shown containing data store 560, user configuration manager 565, display interface 570 connected to admin display unit 155, input interface 575, remote configuration manager 580, network interface 585, and virtual terminal manager 590. Each block is described in detail below.

Data store 560, user configuration manager 565, display interface 570, input interface 575 and network interface 585 perform similar to the corresponding named blocks of FIG. 5A. In particular, display interface 570 provides image data/controls to admin display unit 155, input interface 575 forwards inputs received from input devices associated with administrator system 160 and user configuration manager 565 enables a user using admin system 160 to configure the display properties of admin display unit 155.

Data store 560 stores the current values of various properties used associated with rendering images on different display units. Data store 560 may in addition store the property-value pairs for different profiles, the remote systems/display units present in the computing environment, etc.

Virtual terminal manager 590 provides on admin display unit 155 a virtual terminal/desktop corresponding to another system connected to network 120 (such as remote system 110A), thereby enabling users to configure display properties of one or more display units (such as display unit 115A-115C) associated with remote system 110A. The virtual terminal/desktop may be provided in response to establishing a VNC connection from admin system 160 to remote system 110A, as is well known in the relevant arts.

Accordingly, virtual terminal manager 590 receives the user interface of one of display units 115A-115C via network interface 555 and provides the received user interface on admin display unit 155. Virtual terminal manager 590 also receives inputs provided by a user (via input interface 575) and then forwards the received inputs to virtual network interface 540 (in remote system 110A) via network interface 585.

Thus, virtual terminal manager 590 provides to the user a replica of the user interface displayed in one of display units 115A-115C. As described above, a user may configure the display properties of the replicated display unit using the virtual terminal/desktop.

Remote configuration manager 580, provided according to several aspects of the present invention, enables a user to configure display properties of multiple display units (such as 115A-115C) on remote systems (such as 110A), for example, according to the user interface of FIG. 4 described above.

Remote configuration manager 580 receives an indication from a user (via input interface 575) indicating that the user desires to set the display properties of a display unit associated with a remote system. The indication may be generated by selecting a button, icon or issuing a text command. In response, remote configuration manager 580 identifies a list of remote systems and associated display units connected on network 120 either based on data stored in data store 560 or by executing appropriate program logic.

Remote configuration manager 580 may also retrieve the display properties/profiles of maintained in data store 560. Remote configuration manager 580 then provides a user interface similar to that shown in FIG. 4 on admin display unit 155 (via display interface 570). In response to receiving an indication (via input interface 575), that a user selects some of the display units, remote configuration manager 580 retrieves the values of the display properties of the selected display units from data store 510 and shows the current/retrieved values in the user interface as described above.

In response to receiving user-specified desired values (via input interface 575), remote configuration manager 580 may send the desired values to the appropriate remote systems (for example, the systems that are associated with the selected display units) via network interface 585. Remote configuration manager 580 may also update the values of the display properties of the corresponding selected display units in data store 560.

Remote configuration manager 580 may further check whether the setting of desired values for the display properties has been successfully performed, for example, by retrieving the current values from the remote system and comparing them with the user-specified desired values maintained in data store 560. Remote configuration manager 580 may also provide an indication to the user in the user interface on the status of setting of the display properties.

It should be appreciated that the above-described features may be implemented in a combination of one or more of hardware, software, and firmware (though embodiments are described as being implemented in the form of software instructions). The description is continued with respect to an embodiment in which various features are operative by execution of corresponding software instructions.

8. Digital Processing System

Figure 6:
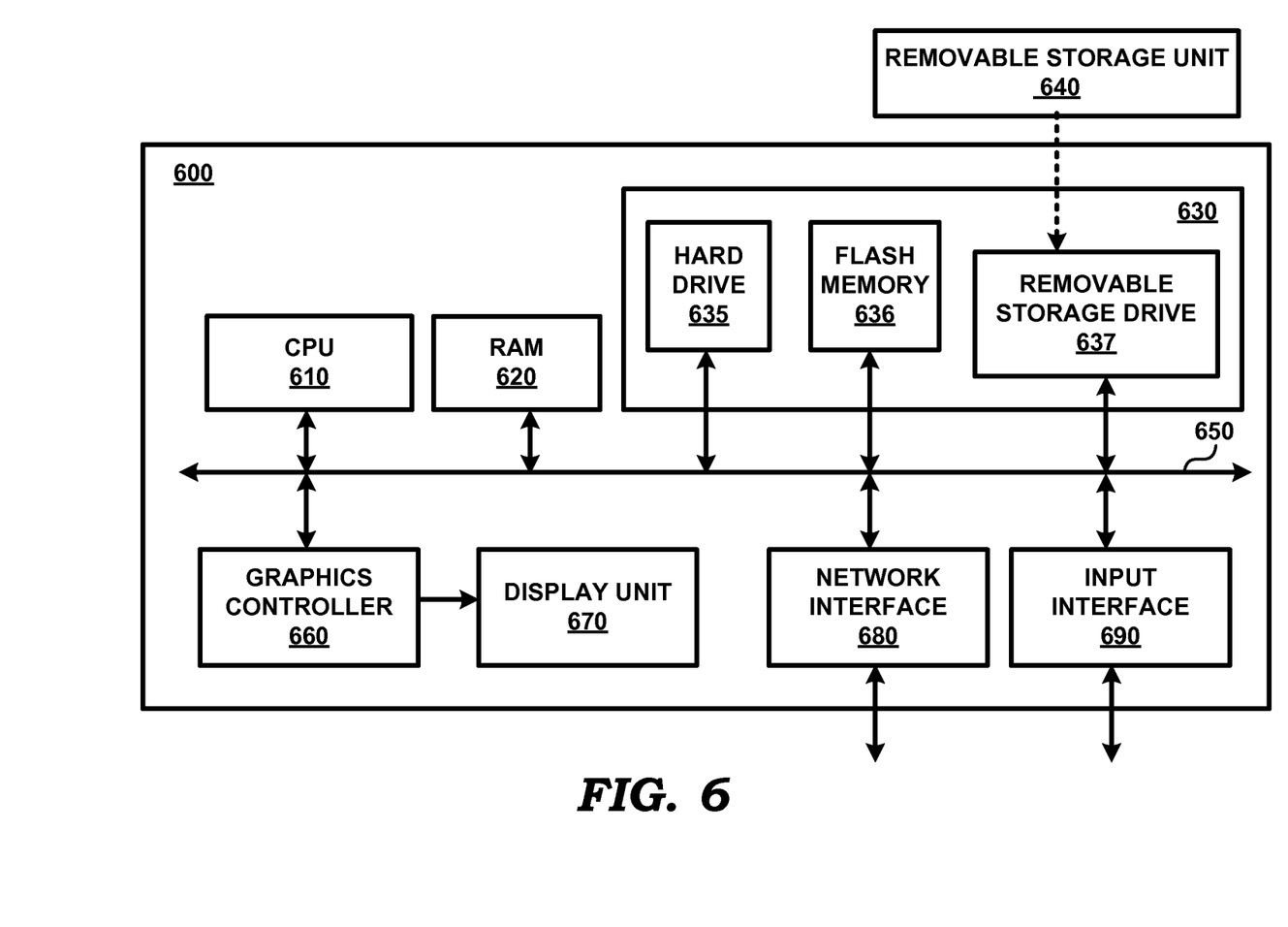
FIG. 6 is a block diagram illustrating the details of a digital processing system in which several features of the present invention are operative upon execution of appropriate software instructions in an embodiment of the present invention.

FIG. 6 is a block diagram illustrating the details of digital processing system 600 in which various aspects of the present invention are operative by execution of appropriate software instructions. Digital processing system 600 may correspond to admin system 160 or any one of remote systems 110A-110P.

Digital processing system 600 may contain one or more processors such as a central processing unit (CPU) 610, random access memory (RAM) 620, secondary memory 630, graphics controller 660, display unit 670, network interface 680, and input interface 690. All the components except display unit 670 may communicate with each other over communication path 650, which may contain several buses as is well known in the relevant arts. The components of FIG. 6 are described below in further detail.

CPU 610 may execute instructions stored in RAM 620 to provide several features of the present invention. CPU 610 may contain multiple processing units, with each processing unit potentially being designed for a specific task. Alternatively, CPU 610 may contain only a single general-purpose processing unit. RAM 620 may receive instructions from secondary memory 630 using communication path 650.

Graphics controller 660 generates display signals (e.g., in RGB format) to display unit 670 based on data/instructions received from CPU 610. Display unit 670 contains a display screen to display the images (e.g., portions of screens as shown in FIG. 4) defined by the display signals. Input interface 690 may correspond to a keyboard and a pointing device (e.g., touch-pad, mouse) and may be used to provide inputs (e.g., such as those required by the user interface of FIG. 4 in case of administrator system 160).

Network interface 680 provides connectivity to a network (e.g., using Internet Protocol), and may be used to communicate with other connected systems (such as remote systems 110A-110P, and admin system 160) of FIG. 1.

Secondary memory 630 may contain hard drive 635, flash memory 636, and removable storage drive 637. Secondary memory 630 may store the data (e.g., details of the remote systems/ display units, and the current values of the display properties in case of remote systems and profiles in case of administrator systems) and software instructions, which enable digital processing system 600 to provide several features in accordance with the present invention.

Some or all of the data and instructions may be provided on removable storage unit 640, and the data and instructions may be read and provided by removable storage drive 637 to CPU 610. Floppy drive, magnetic tape drive, CD-ROM drive, DVD Drive, Flash memory, removable memory chip (PCMCIA Card, EPROM) are examples of such removable storage drive 637.

Removable storage unit 640 may be implemented using medium and storage format compatible with removable storage drive 637 such that removable storage drive 637 can read the data and instructions. Thus, removable storage unit 640 includes a computer readable (storage) medium having stored therein computer software and/or data. However, the computer (or machine, in general) readable medium can be in other forms (e.g., non-removable, random access, etc.).

In this document, the term "computer program product" is used to generally refer to removable storage unit 640 or hard disk installed in hard drive 635. These computer program products are means for providing software to digital processing system 600. CPU 610 may retrieve the software instructions, and execute the instructions to provide various features of the present invention described above.

In an embodiment, display interfaces 530/570 are implemented as a part of respective graphics controllers 660 of remote system and administrator system. In addition, network configuration manager 550 is deployed as a part of graphics controller driver software on each of the remote systems. As is well known, the driver software represents executing software code/ instructions, which is shared by several user level applications to share the various hardware resources, etc. On the other hand, remote configuration manager 580 is implemented as a user application providing the interface depicted with respect to FIG. 4.

It should be understood that numerous specific details, relationships, and methods are set forth to provide a full understanding of the invention. For example, many of the functions units described in this specification have been labeled as modules/blocks in order to more particularly emphasize their implementation independence.

A module/block may be implemented as a hardware circuit containing custom very large scale integration circuits or gate arrays, off-the-shelf semiconductors such as logic chips, transistors or other discrete components. A module/block may also be implemented in programmable hardware devices such as field programmable gate arrays, programmable array logic, programmable logic devices, or the like.

Modules/blocks may also be implemented in software for execution by various types of processors. An identified module of executable code may, for instance, contain one or more physical or logical blocks of computer instructions which may, for instance, be organized as an object, procedure, or function. Nevertheless, the executables of an identified module need not be physically located together, but may contain disparate instructions stored in different locations which when joined logically together constitute the module/block and achieve the stated purpose for the module/block.

It may be appreciated that a module/block of executable code could be a single instruction, or many instructions and may even be distributed over several code segments, among different programs, and across several memory devices. Further, the functionality described with reference to a single module/block can be split across multiple modules/blocks or alternatively the functionality described with respect to multiple modules/blocks can be combined into a single (or other combination of blocks) as will be apparent to a skilled practitioner based on the disclosure provided herein.

Similarly, operational data may be identified and illustrated herein within modules and may be embodied in any suitable form and organized within any suitable type of data structure. The operational data may be collected as a single data set, or may be distributed over different locations including over different member disks, and may exist, at least partially, merely as electronic signals on a system or network.

Reference throughout this specification to "one embodiment", "an embodiment", or similar language means that a particular feature, structure, or characteristic described in connection with the embodiment is included in at least one embodiment of the present invention. Thus, appearances of the phrases "in one embodiment", "in an embodiment" and similar language throughout this specification may, but do not necessarily, all refer to the same embodiment.

Furthermore, the described features, structures, or characteristics of the invention may be combined in any suitable manner in one or more embodiments. In the following description, numerous specific details are provided such as examples of programming, software modules, user selections, network transactions, database queries, database structures, hardware modules, hardware circuits, hardware chips, etc., to provide a thorough understanding of embodiments of the invention.

9. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

It should be understood that the figures and/or screen shots illustrated in the attachments highlighting the functionality and advantages of the present invention are presented for example purposes only. The present invention is sufficiently flexible and configurable, such that it may be utilized in ways other than that shown in the accompanying figures.

Further, the purpose of the following Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way.

What is claimed is:

1. A system comprising:
   a plurality of remote systems, each remote system generating images according to a set of display properties on an associated display unit coupled to each remote system;
   an administrator system; and
   a network coupling said administrator system to said plurality of remote systems,
   wherein said administrator system is operable to enable a user via a graphical user interface to select one of said plurality of remote systems and to specify a set of desired values for a set of properties of a display unit associated with the selected remote system, said administrator system is operable to enable selecting via said graphical user interface a first display unit and a second display unit, said administrator system is operable to enable said graphical user interface to display a value for a display property of said first and second display units and is further operable to enable said graphical user interface to display a pre-defined notation when said first display unit has a different value for said display property than said second display unit;
   wherein the values of said display properties are set to said set of desired values in response to said user specifying said set of desired values such that the selected remote system thereafter generates images on said associated display unit according to said set of desired values for said set of display properties.

2. The system of claim 1, wherein said administrator system enables said user to select more than one remote systems contained in said plurality of remote systems and to specify said set of desired values for all of said more than one remote systems together,
   wherein the values of said display properties of each of said more than one remote systems are set to said set of desired values such that all of said more than one remote systems thereafter generates images on corresponding associated display units according to said set of desired values for said set of display properties.

3. The system of claim 2, wherein said administrator system is associated with a first display unit and a first set of input components, wherein said selection of said more than one remote systems and said specifying of said set of desired values are performed based on said first display unit and said first set of input components, without having to use the display units and input components associated with said plurality of remote systems.

4. The system of claim 3, wherein said administrator system is further operable to retrieve a previous configured values of said plurality of display properties of each of said more than one remote systems, and to display said previous configured values on said administrator display unit.

5. The system of claim 4, wherein said administrator system is operable to:
   display said plurality of remote systems via said graphical user interface on said first display unit;
   receive an indication from an input component that said more than one remote systems are selected by said user according to said graphical user interface;
   receive said set of desired values according to said user graphical interface.

6. The system of claim 5, wherein said user graphical interface comprises a single screen displayed on said first display unit, said single screen comprising:
   a first portion in which said plurality of remote systems are displayed, wherein said user selects said more than one remote systems based on said first portion;
   a second portion in which said previously configured values are displayed;
   a third portion in which said user can specify said set of desired values; and
   a fourth portion, which upon selection sends data on said network to cause each of said more than one remote systems to set said set of display properties to said set of desired values.

7. The system of claim 6, wherein said administrator system stores a plurality of display profiles, each specifying a different set of values for said set of display properties, said single screen further comprising:
   a fifth portion in which said user selects one of said plurality of display profiles, wherein said third portion displays the values stored in the selected display profile for said set of display properties in response to the user selecting the profile.

8. A remote system coupled to a first display unit and a second display unit, said remote system comprising:
   a memory to store a first set of values for a set of display properties;
   a network configuration manager to receive a second set of values on a network from an administrator system coupled to said network, and to overwrite said first set of values with said second set of values at a time instance, wherein said remote system is coupled to said network, wherein said administrator system is operable to enable a user via a graphical user interface to select said remote system and to specify said second set of values for a set of display properties, said administrator system is operable to enable selecting via said graphical user interface said first and second display units, said administrator system is operable to enable said graphical user interface to display a value for a display property of said first and second display units and is further operable to enable said graphical user interface to display a pre-defined notation when said first display unit has a different value for said display property than said second display unit; and a display interface to display image frames on said first and second display units according to the values for said set of display properties stored in said memory, such that said images are displayed according to said first set of values prior to said time instance and according to said second set of values after said time instance.

9. The remote system of claim 8, wherein said network configuration manager is designed to receive a request from said administrator system for values for said set of display properties, said network configuration manager being designed to send said first set of values as a response if said request is received before said time instance and said second set of values otherwise.

10. The remote system of claim 9, wherein said remote system is associated with a set of input components, further comprising:

an input interface to receive a third set of values from said set of input components for said set of display properties at another time instance; and a user configuration manager to store said third set of values for said set of display properties in response to said receiving of said third set of values.

11. The remote system of claim 10, further comprising:

a virtual terminal interface to receive a fourth set of values for said set of display properties at a third time instance, wherein said input interface receives said fourth set of values from said virtual terminal interface and stores said fourth set of values for said set of display properties at said third time instance.

12. The remote system of claim 8, wherein said display interface is comprised in a graphics controller and said network configuration manager is implemented as a device driver in said remote system.

13. A computer readable medium storing one or more sequences of instructions causing an administrator system to enable a user to configure display properties of display units associated with remote systems, wherein execution of said one or more sequences of instructions by one or more processors contained in said administrator system causes said one or more processors to perform the actions comprising:

enabling a user via a graphical user interface to select one of a plurality of remote systems and to specify a set of desired values for a set of properties of a display unit associated with the selected remote system, wherein each remote system is coupled to a display unit, enabling selection via said graphical user interface of a first display unit and a second display unit, enabling said graphical user interface to display a value for a display property of said first and second display units and further enabling said graphical user interface to display a pre-defined notation when said first display unit has a different value for said display property than said second display unit; and sending said set of desired values to the selected remote system to cause said set of display properties to be configured with said set of desired values in said selected remote system.

14. The computer readable medium of claim 13, wherein said enabling enables said user to select more than one remote systems contained in said plurality of remote systems and to specify said set of desired values for all of said more than one remote systems together, wherein said sending sends said set of desired values to each of said more than one remote systems.

15. The computer readable medium of claim 14, wherein said administrator system is associated with a first display unit and a first set of input components, wherein said selection of said more than one remote systems and said specifying of said set of desired values are performed based on said first display unit and said first set of input components, without having to use the display units and input components associated with said plurality of remote systems.

16. The computer readable medium of claim 14, further comprising:

sending a request for a previously configured values for said set of display properties to a first remote system; and receiving from said first remote system said previously configured values of said plurality of display properties of each of said more than one remote systems, in response to said sending of said request.

17. The computer readable medium of claim 16, further comprising:

receiving a first data from an input component indicating that said first remote system has been selected, wherein said sending to said first remote system is performed in response to receiving said first data; and displaying said previously configured values on said administrator display unit.

18. The computer readable medium of claim 17, further comprising:

displaying said plurality of remote systems via said graphical user interface on said first display unit;

receiving an indication from an input component that said more than one remote systems are selected by said user according to said user graphical interface;

receiving said set of desired values according to said user graphical interface.

19. The computer readable medium of claim 18, wherein said user graphical interface comprises a single screen displayed on said first display unit, said single screen comprising:

a first portion in which said plurality of remote systems are displayed, wherein said user selects said more than one remote systems based on said first portion;

a second portion in which said previously configured values are displayed;

a third portion in which said user can specify said set of desired values; and a fourth portion, which upon selection sends data on said network to cause each of said more than one remote systems to set said set of display properties to said set of desired values.

20. The computer readable medium of claim 19, wherein said administrator system stores a plurality of display profiles, each specifying a different set of values for said set of display properties, said single screen further comprising:

a fifth portion in which said user selects one of said plurality of display profiles, wherein said third portion displays the values stored in the selected display profile for said set of display properties in response to the user selecting the profile.

* * * * *